United States Patent
Sakurai

(10) Patent No.: US 8,878,887 B2
(45) Date of Patent: Nov. 4, 2014

(54) OPTICAL SCANNING DEVICE AND IMAGE FORMING APPARATUS EQUIPPED WITH THE SAME

(75) Inventor: Yuuta Sakurai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 12/872,706

(22) Filed: Aug. 31, 2010

(65) Prior Publication Data

US 2011/0050837 A1    Mar. 3, 2011

(30) Foreign Application Priority Data

Sep. 2, 2009   (JP) ................. 2009-202679

(51) Int. Cl.
| | |
|---|---|
| *B41J 2/385* | (2006.01) |
| *B41J 2/41* | (2006.01) |
| *B41J 15/14* | (2006.01) |
| *B41J 2/435* | (2006.01) |
| *B41J 27/00* | (2006.01) |
| *G02B 7/02* | (2006.01) |
| *B41J 2/47* | (2006.01) |
| *G02B 26/12* | (2006.01) |

(52) U.S. Cl.
CPC ............... *B41J 2/471* (2013.01); *G02B 7/023* (2013.01); *G02B 26/125* (2013.01)
USPC ........... 347/242; 347/138; 347/152; 347/245; 347/257; 347/259; 347/261; 347/263

(58) Field of Classification Search
CPC .............. B41J 2/385; B41J 2/41; B41J 27/00
USPC .......... 347/111, 112, 129, 134, 137, 138, 152, 347/224, 225, 256, 257, 258, 259, 260, 261
See application file for complete search history.

(56) References Cited

U.S. PATENT DOCUMENTS

| | | | | |
|---|---|---|---|---|
| 5,625,482 | A | * | 4/1997 | Sugiura ...................... 359/216.1 |
| 2004/0125193 | A1 | * | 7/2004 | Kubo ............................. 347/233 |
| 2005/0190420 | A1 | * | 9/2005 | Imai et al. ..................... 359/210 |
| 2006/0103906 | A1 | * | 5/2006 | Sato et al. ..................... 359/205 |
| 2007/0053042 | A1 | * | 3/2007 | Nakatsu ........................ 359/216 |
| 2008/0292338 | A1 | * | 11/2008 | Fujiwara ........................ 399/44 |

FOREIGN PATENT DOCUMENTS

| | | |
|---|---|---|
| JP | 9218367 A | 8/1997 |
| JP | 2004294714 A | 10/2004 |
| JP | 2006-030705 A | 2/2006 |
| JP | 2006259626 A | 9/2006 |

* cited by examiner

*Primary Examiner* — Justin Seo
*Assistant Examiner* — Kendrick Liu
(74) *Attorney, Agent, or Firm* — Canon USA Inc. IP Division

(57) ABSTRACT

If inclination correction of scanning line is performed while the incident position of the laser beam is not suitable, the shape of a spot of the laser beam which forms an image on a photosensitive drum may not be uniform depending on the scanning position of the laser beam. The housing is provided with a U-shaped groove to which the convex portion of a lens hold member that holds the lens is engaged. With the position of the convex portion adjusted, the convex portion is attached and secured in the U-shaped groove. Thus, the installation position of the lens to an optical path of the laser beam is adjusted, and the lens can be rotated and adjusted in order to correct an inclination or a bending of scanning line.

9 Claims, 11 Drawing Sheets

OPTICAL SCANNING DEVICE AND IMAGE FORMING APPARATUS EQUIPPED WITH THE SAME

BACKGROUND OF THE INVENTION

1. Field of the Invention

The present invention relates to an optical scanning device provided on an electro-graphic image forming apparatus and an image forming apparatus including the optical scanning device.

2. Description of the Related Art

A conventional electro-graphic image forming apparatus scans a photoreceptor (i.e., an image bearing member) with a laser beam that an optical scanning device having a polygon mirror emits, which serves as a light source (i.e., a deflect and scan unit), and forms an electrostatic latent image on the photoreceptor. Then, the image forming apparatus develops the electrostatic latent image with a toner, and transfers and fixes the toner image on a recording medium, thereby forming an image on the recording medium.

In such an image forming apparatus, a displacement of a laser beam occurs as to its irradiation position due to an installation error and insufficiency of manufacturing accuracy of an optical element provided on the optical scanning device, torsion of a housing containing the optical element, thermal deformation owing to heat generation by a drive motor that drives a polygon mirror, thermal deformation which another unit in the main body causes as a heat source, and torsion when the photoreceptor is installed. These phenomena bend and incline a scanning line of the laser beam with which the photoreceptor is scanned, relative to an ideal scanning line. This bending and inclination of the actual scanning line relative to the ideal scanning line reduce image quality.

Particularly, in a color image forming apparatus that forms a scanning line on each of four photoreceptors corresponding to each color of cyan (C), magenta (M), yellow (Y), and black (B), the inclination and bending of the scanning line corresponding to the respective colors significantly influence the quality of the image. In other words, the scanning line of the respective colors is different in degree and direction of the bending and inclination respectively. If such bending and inclination of the scanning line is present, the scanning lines that need to be superimposed are not superimposed on each other. Thus, a color displacement occurs and the quality of image is reduced.

In order to solve such a problem, a technique is discussed in Japanese Patent Application Laid-Open No. 2006-30705 which rotates an optical element (hereinafter, referred to as a lens) having power to refract a laser beam in a sub scanning direction around a rotation shaft parallel to an optical axis of the lens to adjust an inclination of scanning line, which is one factor of a color displacement.

However, as described above, the installed lens shows a geometric tolerance and an installation error, and an optical scanning device has a geometric tolerance and housing torsion. Therefore, when the lens is rotated about the rotation shaft parallel to the optical axis to adjust the inclination of scanning line, a laser beam is not necessarily incident on a predetermined position. If the above-described inclination correction is performed while the incident position of the laser beam on the lens is not suitable, the shape of a spot of the laser beam that forms an image on a photoreceptor may not be uniform depending on the scanning position of the laser beam.

FIG. 11 illustrates a spot diameter distribution (vertical axis) with respect to the amount of displacement (horizontal axis) between a passing position of a laser beam and the lens generatrix in lenses including aspheric surface lenses. The spot diameter refers to a maximum size of a region in a main scanning direction and a sub scanning direction among regions where the level of the quantity of light relative to the peak quantity of light is $1/e^2$ (e is the bottom of a natural logarithm). In other words, the spot diameter refers to a diameter of a cross section in a portion where the quantity of light relative to the peak quantity of light of the laser beam is $1/e^2$ (approximately the quantity of 14% relative to the peak quantity) in a Gaussian distribution that indicates the strength of the laser beam.

Referring to FIG. 11, it is understood that as the amount of displacement from the lens generatrix in an incident position of the laser beam is increased, the spot diameter becomes significantly larger both in the main scanning direction and the sub scanning direction. Further, it can be seen that as the amount of displacement is increased, the spot shape collapses such that the spot is deformed and its shape is distorted, or the spot is rotated.

When the laser beam is incident on a position displaced from the lens generatrix, if the lens is rotated and the inclination correction of the scanning line is performed, the amount of displacement described above may be increased depending on the position of the main scanning direction. Thus, depending on the position of the main scanning direction, the above-described distortion of the spot shape and enlargement of the spot diameter may be facilitated.

If the above-described adverse effect appears, a profile of a latent image when a photoreceptor is exposed does not become the predetermined profile. Accordingly, this causes reduction of image quality such as deterioration in density uniformity and roughness, or characters are not reproduced properly.

SUMMARY OF THE INVENTION

The present invention is directed to an optical scanning device that corrects an incident position when a laser beam is incident on a lens, to suppress deformation and rotation of a spot, or enlargement of a spot diameter when inclination of a scanning line is corrected thereafter.

According to an aspect of the present invention, an optical scanning device includes a light source configured to emit a laser beam to expose a rotating image bearing member; a deflect and scan unit configured to deflect and scan the laser beam emitted from the light source; a lens configured to guide the deflected and scanned laser beam to the image bearing member; a lens hold unit configured to hold the lens to freely rotate the lens so that a direction in which the image bearing member is scanned with the deflected and scanned laser beam guided by the lens can be corrected; an installation unit including an adjustment portion configured to install the lens hold unit to adjust an incident position of the laser beam on the lens so that a change in a spot shape of the laser beam due to rotation of the lens relative to the lens hold unit is suppressed, the image bearing member being scanned with the laser beam; and a securing unit configured to secure the lens hold unit adjusted by the adjustment portion to the installation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. However, a size, a material, a shape, relative arrangement thereof, and the like of a component described in the present exemplary embodiment should be changed as appropriate by a configuration of an apparatus to which the present invention is applied or various types of conditions, and are not intended to limit the scope of this invention to the following exemplary embodiments.

Figure 1:
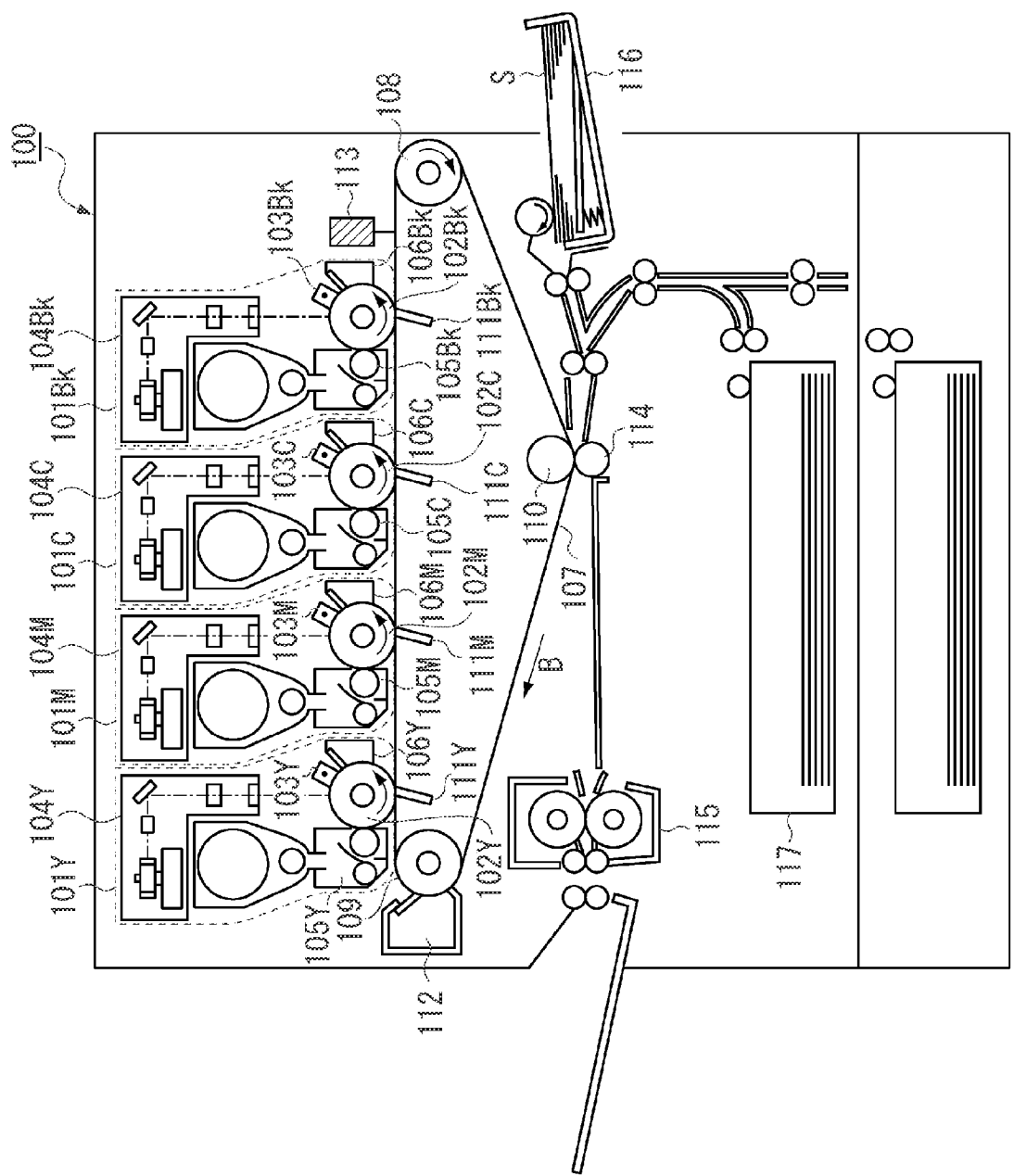
FIG. 1 is a general view illustrating the principal part of a color image forming apparatus according to the present exemplary embodiment.
Figure 2:
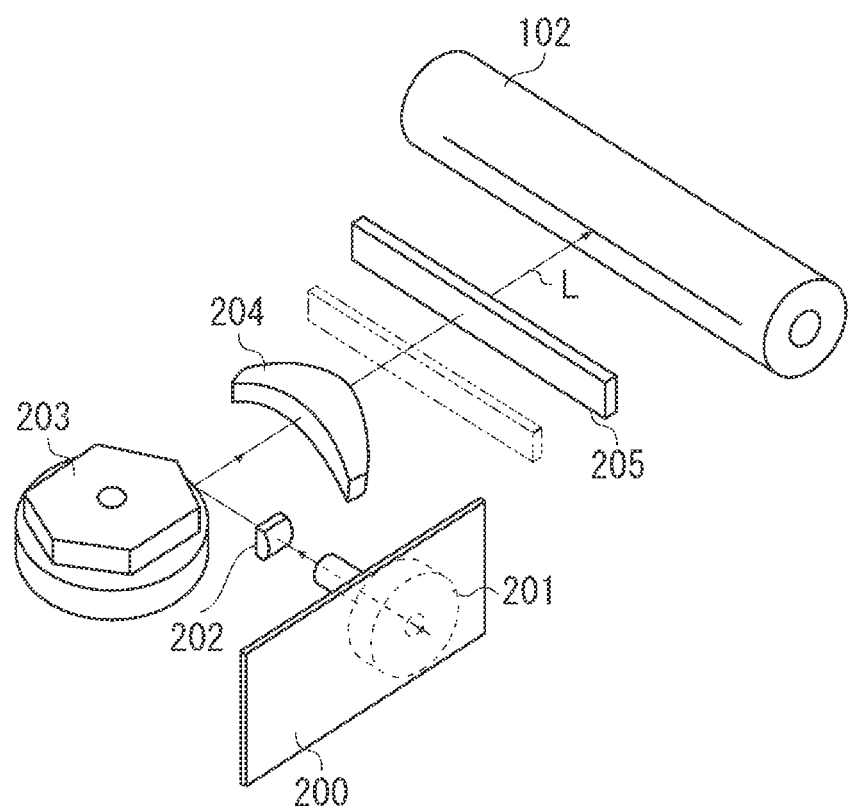
FIG. 2 illustrates a schematically disassembled view of an optical scanning device provided in the color image forming apparatus illustrated in FIG. 1.

FIG. 1 is a schematic view illustrating the principal part when an optical scanning device according to a first exemplary embodiment is applied to a digital full color printer (color image forming apparatus) for forming an image using toner having a plurality of colors. FIG. 2 illustrates a schematic view of an optical scanning device in a digital full color copying machine illustrated in FIG. 1. The present exemplary embodiment will be described referring to the optical scanning device provided in the color image forming apparatus as an example. However, the optical scanning device in the present exemplary embodiment may also be used in an image forming apparatus for forming an image by only a monochromatic toner (e.g., black).

First, the digital full color printer in the present exemplary embodiment will be described referring to FIG. 1. An image forming apparatus 100 includes four image forming units 101Y, 101M, 101C, and 101Bk configured to form an image by color. Y, M, C, and Bk represent yellow, magenta, cyan, and black respectively. The image forming units 101Y, 101M, 101C, and 101Bk use toners of yellow, magenta, cyan, and black respectively to execute image formation.

The image forming units 101Y, 101M, 101C, and 101Bk include photosensitive drums (photoreceptors) 102Y, 102M, 102C, and 102Bk as an image bearing member. Around the photosensitive drums 102Y, 102M, 102C, and 102Bk, charging devices 103Y, 103M, 103C, and 103Bk, optical scanning devices 104Y, 104M, 104C, and 104Bk, and development devices 105Y, 105M, 105C, and 105Bk are provided. Further, around the photosensitive drums 102Y, 102M, 102C, and 102Bk, drum cleaning devices 106Y, 106M, 106C, and 106Bk are disposed. The optical scanning devices 104Y, 104M, 104C, and 104Bk include housings 200Y, 200M, 200C, and 200Bk in which a lens hold member and a support member which will be described below are installed Below the photosensitive drums 102Y, 102M, 102C, and 102Bk, an endless belt-like intermediate transfer belt 107 (intermediate transfer member) is disposed. The intermediate transfer belt 107 is entrained over a driving roller 108 and driven rollers 109 and 110, and rotated in a direction of arrow in FIG. 1 during image formation. Furthermore, primary transfer devices 111Y, 111M, 111C, and 111Bk are provided in a position opposing the photosensitive drums 102Y, 102M, 102C, and 102Bk across the intermediate transfer belt 107. The primary transfer devices 111Y, 111M, 111C, and 111Bk transfer a toner image on the photosensitive drums 102Y, 102M, 102C, and 102Bk onto the intermediate transfer belt 107. Still furthermore, in the vicinity of the intermediate transfer belt 107, a cleaning device 112 configured to clean a toner remaining on the belt and a sensor 113 (detection unit) configured to read a predetermined image pattern are provided in order to detect the amount of displacement of a toner image having respective colors.

Further, the image forming apparatus 100 in the present exemplary embodiment includes a secondary transfer device 114 for transferring the toner image on the intermediate transfer belt 107 onto a recording medium S such as a paper and a fixing device 115 for fixing the toner image on the recording medium S.

The image forming process of the image forming apparatus 100 having such the configuration will be described. The image forming process in each image forming unit is similar. Thus, the image forming process in the image forming unit will be described referring to the image forming unit 101Y. With respect to the image forming processes in the image forming units 101M, 101C, and 101Bk, description will be omitted.

First, the photosensitive drum 102Y is charged by the charging device on the image forming unit 101Y. A laser beam emitted from a light source, which will be described below, is scan-deflected by a polygon mirror, which will be described below, to scan the charged photosensitive drum 102Y (on image bearing member) based on image data. Thus, in an exposure portion on the photosensitive drum 102Y, an electrostatic latent image is formed in a main scanning direction (direction of rotation shaft on photosensitive drum 102Y). Further, during exposure, since the photosensitive drum 102Y is rotated, by repeating the scanning with the laser beam, also in a sub scanning direction (direction of rotation shaft on photosensitive drum 102Y) of the photosensitive drum 102Y, the electrostatic latent image is formed. Thereafter, the electrostatic latent image is developed by the development device 105Y as a yellow toner image.

A yellow, a magenta, a cyan, and a black toner images formed on the photosensitive drums 102Y, 102M, 102C, and 102Bk on each image forming unit are transferred onto the intermediate transfer belt 107 by the primary transfer devices 111Y, 111M, 111C, and 111Bk respectively. Thus, the toner image having respective colors is superimposed on the intermediate transfer belt 107.

When the transfer of the four-color toner image on the intermediate transfer belt 107 ends, the four-color toner image on the intermediate transfer belt 107 is repeatedly transferred (secondary transfer) on the recording medium S conveyed from a manual feed cassette 116 or a paper feed cassette 117 (multipurpose tray) onto a secondary transfer position by the secondary transfer device 114. This recording medium S is conveyed so as to match feeding timing of the toner image on the intermediate transfer belt 107 by a feed roller and a conveyance roller in the manual feed cassette 116 or the paper feed cassette 117, and a registration roller. Then, the toner image on the recording medium S after the secondary transfer ends is subjected to heat fixing by the fixing device 115 and discharged to a paper discharge unit 118. Thus, a full color image is obtained on the recording medium S.

The remaining toner is removed from the respective photosensitive drums 102Y, 102M, 102C, and 102Bk after transfer ends, by the drum cleaning devices 106Y, 106M, 106C, and 106Bk, and the drums wait for subsequent image formation.

In the vicinity of the intermediate transfer belt 107, the sensor 113 (detection unit) is provided. The sensor 113 detects a predetermined pattern image for color displacement (registration) detection, which is formed to detect the amount of displacement of a toner image formed by the respective image forming units 101Y, 101M, 101C, and 101Bk on the intermediate transfer belt 107. Three sensors 113 having the same configuration are disposed at three places, namely the back side, the center, and front side of the intermediate transfer belt 107 (direction roughly perpendicular to image conveyance direction (moving direction)) in FIG. 1. A central processing unit (CPU) provided on the image forming apparatus 100 causes the sensor 113 to detect this pattern image, detects the amount of displacement of an image formed by the respective image forming units 101Y, 101M, 101C, and 101Bk on the intermediate transfer belt 107, and controls emission timing of the laser beam so that the amount of displacement is corrected.

Next, referring to FIG. 2, the optical scanning devices 104Y, 104M, 104C, and 104Bk will be described. The configuration of each optical scanning device is similar. Thus, suffixes Y, M, C, and Bk indicating a color are omitted. FIG. 2 is a perspective view schematically illustrating the photosensitive drum 102 in a planar state, which corresponds to the member disposed inside the housing of the optical scanning device 104 and the optical scanning device 104 in FIG. 1.

On the optical scanning device 104, a light source 201 for emitting a laser beam to the housing 200 is mounted. In FIG. 2, a part of the housing 200 is illustrated. However, the housing 200 corresponds to the external frame of the optical scanning devices 104Y, 104M, 104C, and 104Bk illustrated in FIG. 1. Inside the housing 200, the light source 201, a polygon mirror 203, which will be described below, and various types of lenses are disposed. In the light source 201, a collimator lens that converts a laser beam into a parallel beam and an aperture diaphragm are incorporated. The laser beam emitted from the light source 201 passes through a cylindrical lens 202 having the predetermined refractive force in a sub scanning direction, disposed on the optical path, and is deflected by the polygon mirror 203. The laser beam deflected by the polygon mirror 203 is guided onto the photosensitive drum 102 by a toric lens 204 and an image formation lens 205. The image formation lens 205 is provided for the purpose of unifying a spot diameter in a scanning direction of the laser beam on the photosensitive drum. The laser beam guided onto the photosensitive drum 102 scans the photosensitive drum 102. In FIG. 2, for sake of simplicity, description of a reflection mirror that reflects the laser beam deflected by the polygon mirror 203 toward the photosensitive drum 102 is omitted.

Figure 3A:
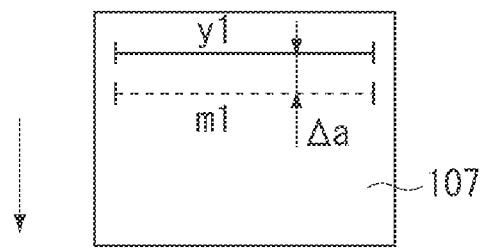
FIGS. 3A, 3B, 3C, 3D, 3E, and 3F illustrate lines of toner images transferred on an intermediate transfer belt.
Figure 3B:
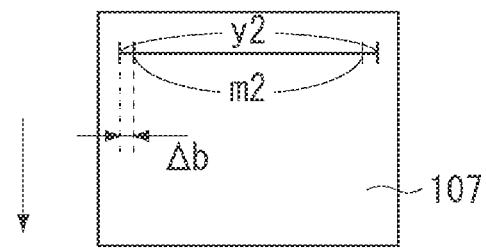
Figure 3C:
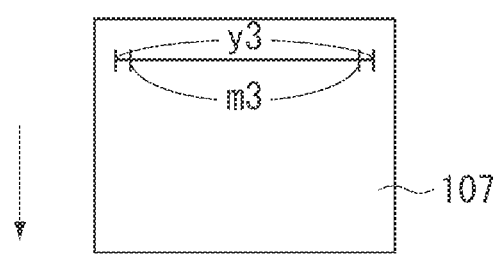
Figure 3D:
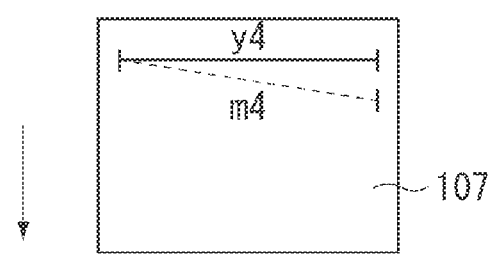
Figure 3E:
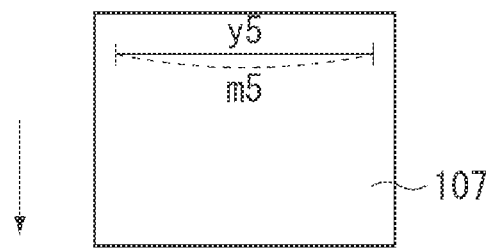
Figure 3F:
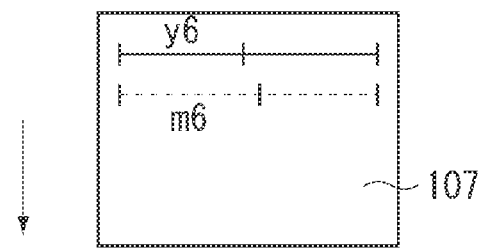

Subsequently, the type of displacements of the above-described image will be described. FIGS. 3A to 3C are diagrams illustrating a displacement of yellow lines y1 to y3 and magenta lines m1 to m3 transferred onto the intermediate transfer belt 107. FIGS. 3D to 3E are diagrams illustrating a housing in which magenta lines m4 and m5 that need to be superimposed thereon have an inclination and a bending to straight yellow lines y4 and y5. FIG. 3F illustrates a housing in which a magnification between right and left of both a yellow line y6 and a magenta line m6 is different.

An arrow in FIG. 3 indicates a conveyance direction of an image on the intermediate transfer belt 107 and corresponds to the above-described sub scanning direction. In the plane of the intermediate transfer belt 107, a direction perpendicular to the conveyance direction corresponds to a direction (main scanning direction) in which a scanning line is formed on a photosensitive drum. In FIG. 3, the type of displacements between a yellow line and another color line will be described with reference to yellow. However, a reference color may be any color.

First, in a case in which a displacement of line Δa (refer to FIG. 3A) occurs in a sub scanning direction, timing of laser writing is varied by a necessary amount so that line y1 and the lime m1 are superimposed. For example, in FIG. 3A, since line y1 precedes line m1 in a sub scanning direction, in order to superimpose line m1 on line y1, timing to form a scanning line of line m1 is made earlier. Contrary to this, in a case in which line m1 precedes line y1 in a sub scanning direction, timing to form a scanning line of line m1 is made later.

In a case in which a displacement Δb (refer to FIG. 3B) between line y2 and line m2 occurs in a main scanning direction, timing to start exposure within one scanning is varied by a necessary amount, thereby correcting the displacement. For example, in FIG. 3B, line y2 precedes line m2 in a main scanning direction. Thus, in order to superimpose line m2 on line y2, timing to emit a laser beam from the light source 201M within one scanning is made earlier. Contrary to this, in a case in which line m2 precedes line y2 in a main scanning direction, timing to emit a laser beam from the light source 201M within one scanning is made later.

In a case in which the displacement of magnification of a line occurs in a main scanning direction (length in main scanning direction is y3 ‡ m3) (refer to FIG. 3C), the CPU executes frequency modulation of a radiation pulse signal that causes the light source to emit light. For example, in FIG. 3C, a length in a main scanning direction of line m3 is shorter than a length in a main scanning direction of line y3. Thus, the width of a radiation pulse per one pixel is widened in a case in which a scanning line of line m3 is formed in order to make a length between line y3 and line m3 the same.

With respect to the above-describe three displacements, radiation timing of the light source 201 and a frequency of image data for emitting the laser beam from the light source 201 are changed. Thus, correction can relatively easily be performed. However, with respect to an inclination of line (refer to FIG. 3D) and a bending of line (curvature) (refer to FIG. 3E) which are one type of displacement of scanning line, adjustment by changing an image signal similar to that described above complicates control. Accordingly, satisfactory correction cannot be performed. Correction of the inclination of line and the bending of line is performed by adjusting a displacement angle of a lens. In the present exemplary embodiment, the inclination of line (hereinafter, referred to as scanning line) and the bending of scanning line are corrected by rotating the image formation lens 205 freely around the predetermined shaft. Further, also concerning a displacement of single magnification (refer to FIG. 3F) that is a displacement of magnification between right and left of an image which is one type of displacement of scanning line, correction can simply be performed by adjusting positional disposition of an optical lens. Thus, also correction of this amount of displacement is executed by adjusting the position of disposition of the optical lens. Two lines y6 and m6 illustrated in FIG. 3F are lines which are essentially superimposed. However, in order to simply describe the displacement of magnification between right and left of line y6 and line m6, in FIG. 3F, line y6 and line m6 are shown displaced in a sub scanning direction.

Figure 4A:
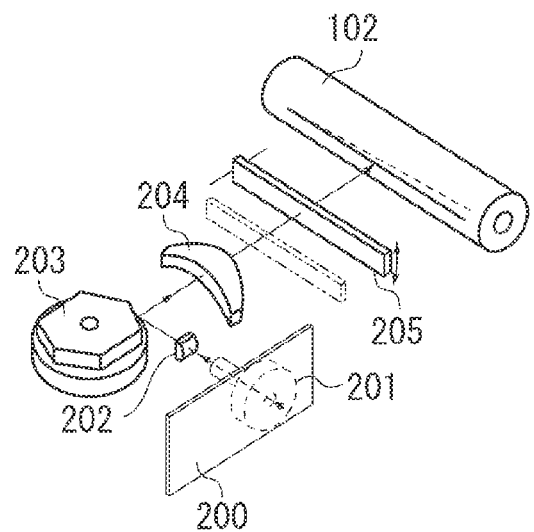
FIGS. 4A, 4B, and 4C illustrate a rotation direction and a moving direction of a lens when an inclination of scanning line, a bending of scanning line, and a difference of magnification between left and right are corrected.

Referring to FIG. 4, a method for correcting an inclination of scanning line, a bending of scanning line, and a displacement of magnification between right and left will be described. FIG. 4 illustrates a rotation direction and a moving direction of a lens when the inclination of scanning line, the bending of scanning line, and the displacement of magnification between right and left are corrected. First, a method for correcting the inclination of scanning line will be described referring to FIG. 4A. The image formation lens 205 is rotated within a plane with its optical axis as the normal while a shaft parallel to the optical axis of the image formation lens 205 works as a rotation shaft in one end of the image formation lens 205 in a longitudinal direction (direction of arrow in FIG. 4A). When the image formation lens 205 is rotated as described above, a scanning line on a photosensitive drum is shifted, for example, from a solid line to a dotted line or from a dotted line to a solid line. Accordingly, when a magenta line is inclined relative to a yellow line, the image formation lens 205M of the optical scanning device corresponding to magenta is rotated about the above-described rotation shaft. Thus, an inclination of scanning line of magenta is corrected, and the line of yellow and the line of magenta are superimposed. Further, when a scanning line of yellow and a scanning line of magenta are inclined relative to an ideal scanning line (predetermined scanning line), an image formation lens of an optical scanning device corresponding to yellow and magenta may also be rotated about the above-described rotation shaft. In this case, correction is performed so as to superimpose the scanning line of yellow and the scanning line of magenta on the ideal scanning line. As the result, developed lines of them overlap with each other.

The amount of rotation (rotation angle) of the image formation lens 205 and the amount of inclination of scanning line have a roughly proportional relation. The relation is grasped at a designing stage. Accordingly, the above-described predetermined image pattern is formed. From the detected result, the amount of inclination is calculated. A rotation device such as a stepping motor rotates or a service man manually rotates the image formation lens 205 by the amount required for correction of a displacement based on the amount of inclination. Thus, the inclination of scanning line can be adjusted.

Adjustment of bending of scanning line is executed as follows. The image formation lens 205 is rotated in a direction of arrow around a shaft which passes through inside the image formation lens 205 illustrated in FIG. 4B and is parallel to the longitudinal direction of the image formation lens 205. Then, the scanning line is corrected so as to be close to an ideal line.

The amount of rotation of this image formation lens 205 and the amount of bending of scanning line have a roughly proportional relation. The relation is grasped at a designing stage. Accordingly, the image formation lens 205 is rotated by the amount required for correction of the bending. Thus, the bending of scanning line can be adjusted.

Figure 4B:
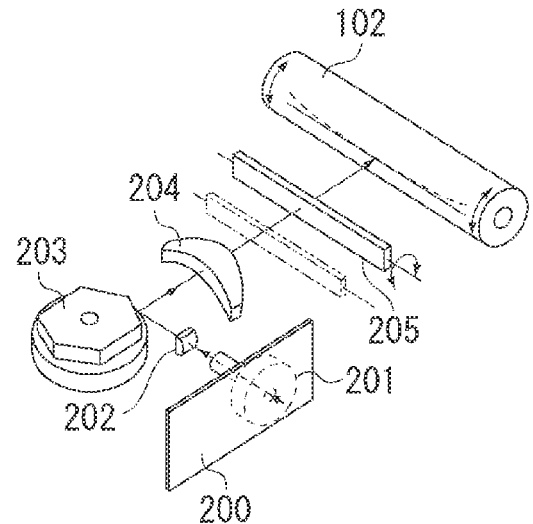
Figure 4C:
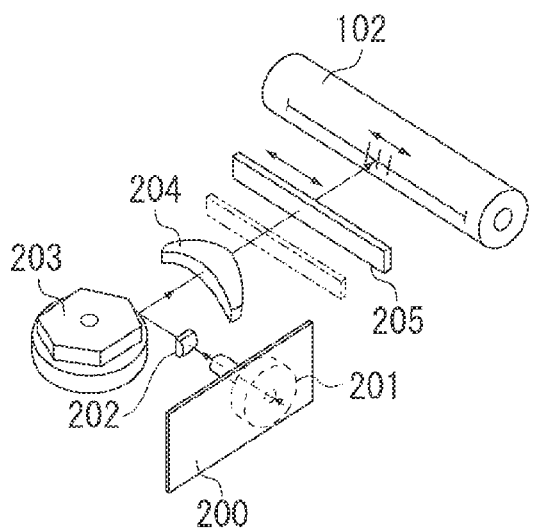

With respect to adjustment of a single magnification of scanning line, as illustrated in FIG. 4C, the image formation lens 205 is moved in a direction of arrow that is a longitudinal direction. Thus, the center of an image (center of scanning line) is moved in a main scanning direction. The amount of movement of this image formation lens 205 and the single magnification of scanning line have a roughly proportional relation. The relation is grasped at a stage of design. Accordingly, the image formation lens 205 is moved by the amount required for correction of the single magnification. Thus, the single magnification of scanning line can be adjusted. As illustrated in FIG. 4C, the end of a scanning line will also be moved by moving the image formation lens 205. However, the amount of movement at the end of a scanning line at that time is negligible small compared with the amount of movement at the center of the scanning line.

By executing the above-described adjustment, in each color, the inclination and the bending of scanning line are corrected. Thus, the displacement of each type of colors can be suppressed. However, if the above-described adjustment is executed while the initial installation position of the image formation lens 205 relative to the optical path of a laser beam is not suitable, the spot shape of the laser beam with which an image is formed on the photosensitive drum 102 may not become uniform for each scanning position of the laser beam. This causes the laser beam to pass through a lens at the optical path subtly displaced from a position estimated at the time of designing. Further, the laser beam passes through a position different from a position estimated at the time of designing. Thus, the refracting direction of the laser beam is not a desired one.

Accordingly, the optical path of the laser beam may not be a desired path. In this case, the laser beam will not form an image in the desired position of a photoreceptor. The enlargement of a spot diameter and the displacement of image formation position of the above-described laser beam may similarly occur when correction of the bending illustrated in FIG. 4B is performed. Thus, in the present exemplary embodiment, the optical scanning device performs initial adjustment so that the image formation lens 205 is disposed in a suitable position to the optical path of the laser beam before adjustment of the above-described inclination, bending, and the like is executed. The configuration will be described below. The following configuration is common to each of the optical scanning devices of yellow, magenta, cyan, and black. Thus, suffixes Y, M, C, and Bk, therefore reference numerals will be omitted.

Figure 5A:
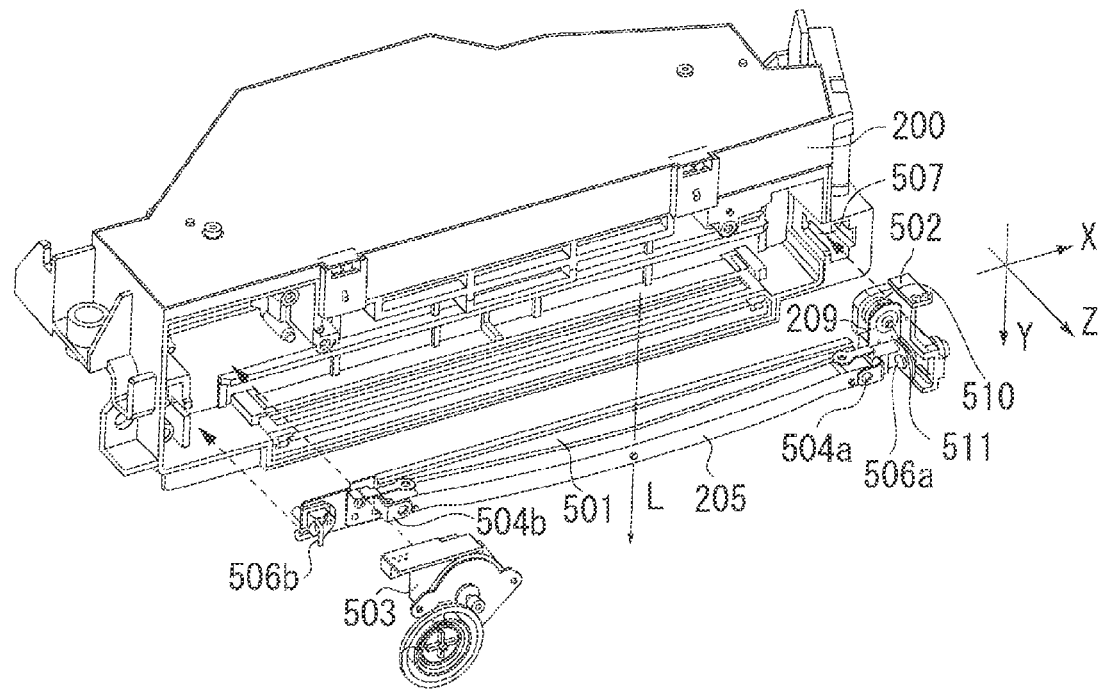
FIGS. 5A and 5B illustrate a method for supporting an image formation lens.

FIG. 5A illustrates a state before the image formation lens 205 is installed in the housing 200 of the optical scanning device. In FIG. 5A, an X-axis direction is a direction to which a laser beam is scanned. A Y-axis direction is an optical axis direction of the image formation lens 205. A Z-axis direction is a direction orthogonal to the X-axis direction and the Y-axis direction. In other words, the Z-axis direction is a direction orthogonal to an optical axis L of the mage formation lens 205 and a direction in which the mage formation lens 205 is scanned with a laser beam. The housing 200 of the optical scanning device illustrated in FIG. 5A corresponds to the shape of the housing of the optical scanning devices 104Y, 104M, 104C, and 104Bk illustrated in FIG. 1. The Y-axis direction in FIG. 5 corresponds to a vertical direction in FIG. 1.

In FIG. 5A, the laser beam is incident on the image formation lens 205 from the upper side in a Y-axis direction to scan the image formation lens 205 in an X-axis direction. As illustrated in FIG. 5A, the image formation lens 205 is held by a lens hold member 501. The lens hold member 501 includes plate springs 504a and 504b. The image formation lens 205 is biased to the lens hold member 501 by urging force. Further, the image formation lens 205 and the lens hold member 501 are installed in the housing 200, which is an installation unit, via a support member 502. The support member 502 constitutes a lens hold unit together with the lens hold member 501. The support member 502 supports one end of the lens hold member 501 that holds the image formation lens 205 to the housing 200 as described below. In FIG. 5A, the one end of the lens hold member refers to the end on the side on which the plate spring 504a is mounted in a longitudinal direction of the lens hold member 501. The lens hold member 501 allows the support member 502 to rotate around the one end. The housing 200 is provided with a drive motor 503. The drive motor 503 is provided with a swing cam, which is an inclination correction unit configured to correct an inclination of scanning line. Furthermore, the lens hold member 501 is provided with a cam follower (not illustrated) at another end on the side opposite to the above-described one end in a longitudinal direction of the lens hold member 501. The above-described swing cam is engaged with the cam follower. The lens hold member 501 is provided so that the image formation lens 205 is rotated in an X-Z plane (plane perpendicular to optical axis L of image formation lens 205) around one end on the side, on which the plate spring 504a is mounted, with the Y axis (shaft parallel to optical axis L of image formation lens 205) in FIG. 5A as a rotation shaft. In FIG. 5A, another end on the opposite side refers to an end on the side on which the plate spring 504b is mounted in a longitudinal direction of the lens hold member 501. The image formation lens 205, the lens hold member 501, the support member 502, and the drive motor 503 are fitted to the housing 200 as illustrated by arrow of a dotted line in FIG. 5A.

Figure 5B:
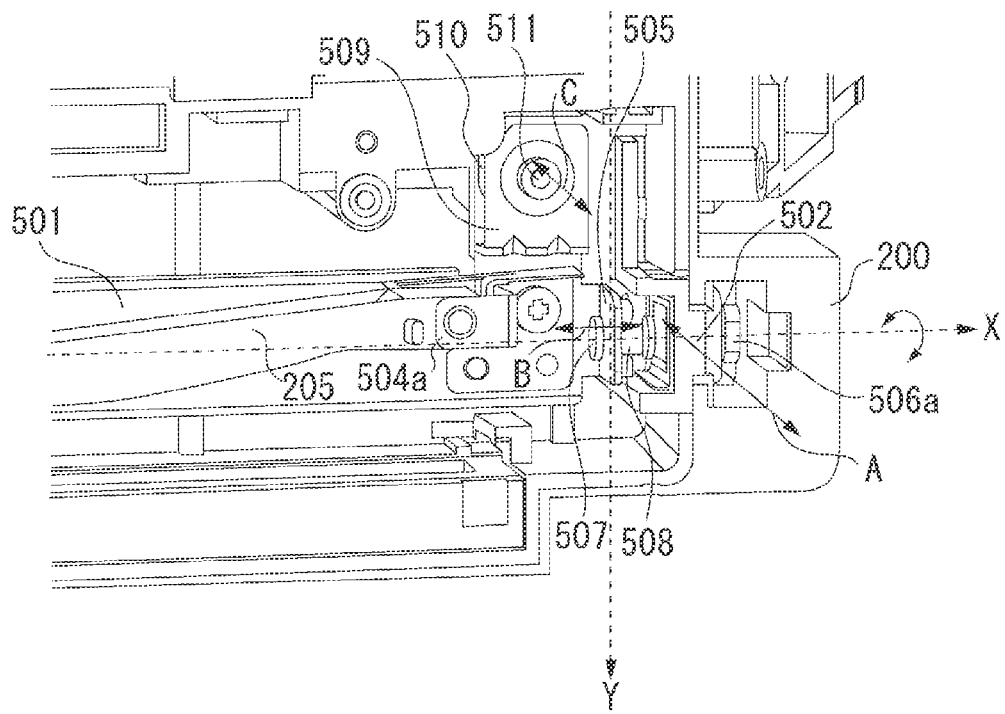

The image formation lens 205 is provided for the purpose of uniforming a spot diameter in a scanning direction of the laser beam on the photosensitive drum. In the present exemplary embodiment, an aspheric resin-made lens is used as the image formation lens 205. The image formation lens 205 includes a lens and a projection which cause the incident laser beam to form an image. This projection is provided to secure the lens to the lens hold member 501 and the plate springs 504a and 505b are biased thereby. FIG. 5B illustrates an enlarged view around the support member 502 installed in the housing 200.

As illustrated in FIG. 5B, a vertical bending portion 505 is provided at the end in a longitudinal direction of the lens hold member 501. On the vertical bending portion 505, a circular hole is made. A rotation shaft 506 penetrates through the circular hole, which causes the image formation lens 205 to freely rotate around the longitudinal direction of the image formation lens 205. Then, at one end of the rotation shaft 506, a dislocation prevention portion 506a is provided, which prevents dislocation of the rotation shaft 506 from the circular hole.

On the other hand, at another end of the rotation shaft 506, a male screw is provided which is a single magnification correction unit configured to correct a displacement of magnification between right and left of a scanning line. The male screw on the above-described rotation shaft 506 is engaged with the support member 502 in which a female screw is formed. Between the vertical bending portion 505 and the lens hold member 501, a plate spring for adjustment 508 configured to adjust a single magnification is provided. The plate spring for adjustment 508 has a U-shape. The exteriors of both sides opposing each other abuts on the vertical bending portion 505 and the housing 200 to provide urging force so as to mutually extend the vertical bending portion 505 and the housing 200. Thus, the plate spring for adjustment 508 abuts on the vertical bending portion 505 in the dislocation prevention portion 506a by the pushing force.

In an assembling or maintenance process at a factory, the rotation shaft 506 is rotated. Thus, the male screw is rotated relative to the female screw on the support member 502. Hence, the dislocation prevention portion 506a is moved in a direction of arrow B (X-axis direction) in FIG. 5B. Then, the vertical bending portion 505 abutting on the dislocation prevention portion 506a urged by the plate spring for adjustment 508 is also moved in a direction of arrow B. Thus, the lens hold member 501 integrally configured with the vertical bending portion 505 is moved in a direction of arrow B. Thus, the displacement of magnification between right and left of a scanning line of each color on the photosensitive drum described in FIG. 4C is corrected by adjusting the position of the image formation lens 205.

Further, the circular hole on the vertical bending portion 505 through which the rotation shaft 506 penetrates is configured with a diameter having allowance relative to the rotation shaft 506. Consequently, the vertical bending portion 505 swings around the rotation shaft 506 against urging force of the plate spring for adjustment 508. Thus, the lens hold member 501 can rotate owing to movement of the swing cam installed in the above-described drive motor 503 in a plane having the optical axis of the image formation lens 205 as the normal while a contact point between the dislocation prevention portion 506a and the vertical bending portion 505 works as a fulcrum. This fulcrum changes its position depending on a direction in which the drive motor 503 rotates the lens hold member 501. The dislocation prevention portion 506a abuts on the vertical bending portion 505 along the circle of the circular hole provided on the vertical bending portion 505.

In FIG. 5A, when another end described above on the lens hold member 501 is moved in a direction separating from the housing 200 by driving the drive motor 503, with respect to the above-described fulcrum, a contact point between the dislocation prevention portion 506a and the vertical bending portion 505 on a side closest to the housing 200 in the Z-axis direction in FIG. 5B becomes the rotation center. On the other hand, also in FIG. 5A, when the above-described another end of the lens hold member 501 is moved to the housing 200 side by driving the drive motor 503, the above-described fulcrum becomes the contact point between the dislocation prevention portion 506a in a position closer to the housing 200 and the vertical bending portion 505 in a Z-axis direction in FIG. 5B.

By the configuration as described above, the lens hold member 501 is configured to freely rotate around the shaft parallel to the optical axis L passing through the above-described point of contact in a plane perpendicular to the optical axis of the image formation lens 205. On the lens hold member 501, the image formation lens 205 is held. Thus, by rotating the lens hold member 501, the image formation lens 205 can also simultaneously be rotated around the shaft parallel to the optical axis L passing through the above-described point of contact. On the face of the portion where the dislocation prevention portion 506a abuts on the vertical bending portion 505, a curved surface is formed. When the image formation lens 205 is rotated around the above-described fulcrum, the rotation shaft 506 is slid along this curved surface. Thus, the rotation shaft 506 can be easily moved through the internal face of the circular hole compared with a case in which the curved surface is not formed. Thus, the inclination of scanning line on the photosensitive drum described in FIG. 4A can be corrected.

Furthermore, the image formation lens 205 allows rotation around the shaft parallel to the longitudinal direction of the image formation lens 205. As illustrated in FIG. 5B, the lens hold member 501 is provided with a flexion portion 509 in the vicinity of the vertical bending portion 505. The flexion portion 509 is integrally formed with the lens hold member 501 so as to extend to the side on which a laser beam is incident from the end of the lens hold member 501. The flexion portion 509 is formed with a circular hole. Between the flexion portion 509 and the support member 502, a ring-shaped compression spring 510 (refer to FIG. 5A) is provided. A bend adjustment screw 511, which is a bend correction unit configured to correct the bending of scanning line, is passed through the circular hole on the flexion portion 509 and the compression spring 510. The bend adjustment screw 511 is engaged with the support member 502. When this bend adjustment screw 511 is rotated, the compression spring 510 is elastically deformed. By elastic force generated at this time, the flexion portion 502 is pressed against the bend adjustment screw 511. By such a configuration, the flexion portion 509 is moved in a direction indicated by arrow C. The lens hold member 501 is also moved following the movement of the flexion portion 509. At this time, the rotation shaft 506 is passed through the circular hole in the vertical bending portion 505 of the lens hold member 501. Thus, by rotating the bend adjustment screw 511, the lens hold member 501 freely rotates around the X axis about the rotation shaft 506. Hence, the bending of scanning line on the photosensitive drum described in FIG. 4B can be corrected.

Next, the feature in the present exemplary embodiment will be described. On the housing 200, a U-shaped groove 507 (refer to FIG. 5A) as an adjustment portion (engaging portion) is provided. On the support member 502, a convex portion to be engaged with this U-shaped groove 507 is provided. The convex portion on the support member 502 can be moved along the U-shaped groove 507 and functions as an adjustment piece. By moving the support member 502 in the U-shaped groove, a point of contact between the dislocation prevention portion 506a and the vertical bending portion 505 on the image formation lens 205, and the rotation shaft 506 can be moved in a direction of arrow A (Z-axis direction) illustrated in FIG. 5B. Further, the U-shaped groove 507 serves to restrict movement so that the support member 502 cannot be moved in a Y-axis direction. The installation position of the support member 502 relative to the housing 200 is adjusted so that a laser beam is incident on the predetermined position on the image formation lens 205. After adjustment, the support member 502 is attached and secured in a suitable position within the U-shaped groove.

Figure 6:
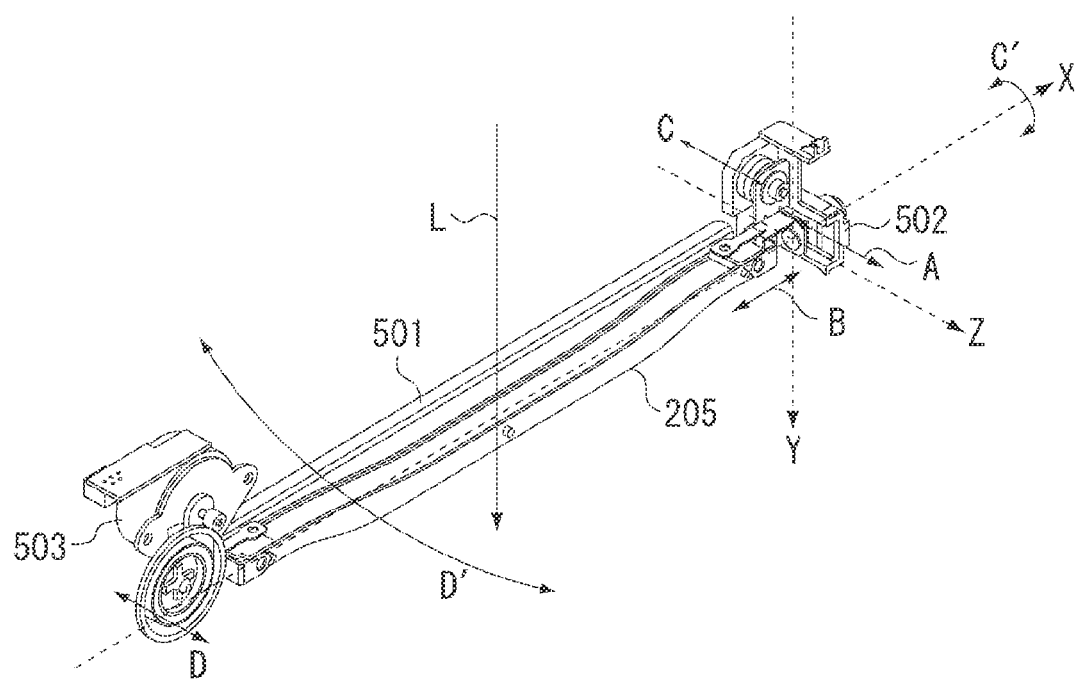
FIG. 6 illustrates a moving direction of an image formation lens when various types of adjustment are executed.

FIG. 6 illustrates a moving direction of the image formation lens 205 when various types of adjustment are executed. First, when the support member 502 is moved along the U-shaped groove 507, the lens hold member 501 is moved following the support member. Thus, a laser beam can be incident on a suitable position on the image formation lens. When the support member 502 is secured in the suitable position, a point of contact between the dislocation prevention portion 506a and the vertical bending portion 505, and rotation shaft 506 are positioned.

After the above-described adjustment, the following adjustment is executed. A male screw is rotated into a female screw formed on the support member 502. Thus, the image formation lens 205 can be moved in a direction of arrow B. Thus, as illustrated in FIG. 4C, adjustment of the single magnification of scanning line can be executed. Further, the adjustment screw 511 is rotated and the flexion portion 509 is moved in a direction of arrow C. Thus, the image formation lens 205 can be rotated around the rotation shaft 506 (shaft parallel to X axis) (in a direction of arrow C). Thus, adjustment of bending of scanning line can be executed as illustrated in FIG. 413. Further, by driving the drive motor 503 to move the end in a direction of arrow D, the image formation lens 205 can be rotated within a plane having the optical axis of the image formation lens 205 as the normal while a point of contact between the dislocation prevention portion 506a and the vertical bending portion 505 serves as a fulcrum (direction of arrow D'). Thus, as illustrated in FIG. 4A, adjustment of inclination of scanning line can be executed.

Figure 7:
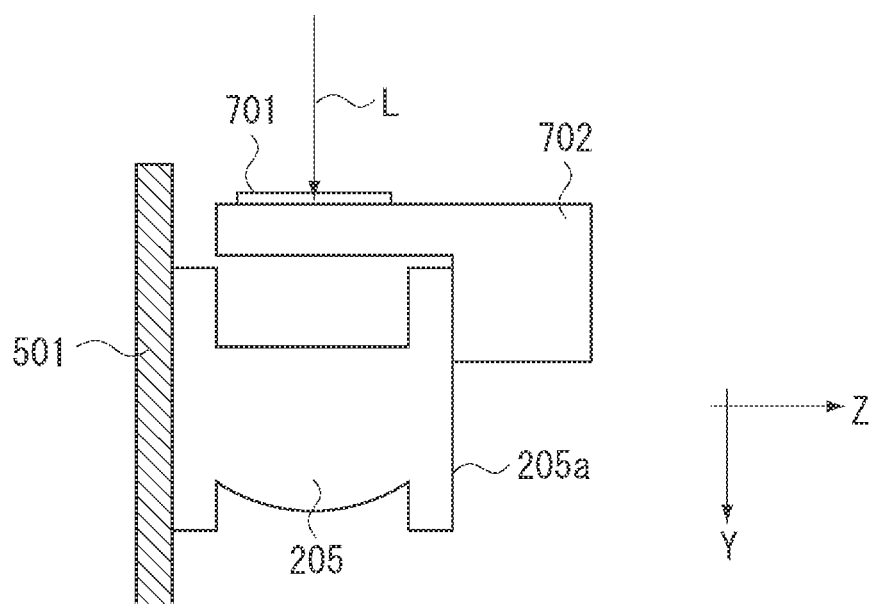
FIG. 7 illustrates a cross section when an image formation lens and a lens support member are viewed from an X-axis direction.

Next, referring to FIG. 7, a method for adjusting the installation position of the support member 502 to the U-shaped groove 507 (initial adjustment) will be described. FIG. 7 illustrates a cross section when the image formation lens 205 and the lens support member 502 are viewed from an X-direction in FIG. 5. This initial adjustment is executed using a charge coupled device (CCD) sensor jig 702 having a CCD line sensor 701 when shipped from a factory or maintained by a serviceman. A plurality of sensor detection faces on the CCD line sensor 701 is arranged in a Z-axis direction. As illustrated in FIG. 7, the CCD sensor jig 702 abuts on the end face 205a of the image formation lens 205 and a laser beam is incident on the CCD line sensor 701. At this time, the CCD line sensor 701 abuts on the end face 205a of the image formation lens 205 on the side close to a contact point between the dislocation prevention portion 506a and the vertical bending portion 505 in a longitudinal direction of the image formation lens 205. Another end of the above-described lens hold member 501 is connected to the drive motor 503 via the swing cam. Thus, at the time of initial adjustment, another end cannot be moved. Accordingly, it is desirable that the CCD line sensor 701 is installed on the side as close as possible to the contact point between the dislocation prevention portion 506a and the vertical bending portion 505. As described above, the initial position of the contact point between the dislocation prevention portion 506a and the vertical bending portion 505 can be adjusted in a Z-axis direction in FIG. 5A. Thus, the CCD line sensor 701 is disposed in a position (above-described one end side) close to the contact point instead of the center in a longitudinal direction of the image formation lens 205 or the above-described another end. Then, the position of the image formation lens 205 to the housing 200 is adjusted corresponding to the optical path of a laser beam. Thus, initial adjustment of the image formation lens 205 to the optical path of the laser beam can be highly accurately executed.

The CCD sensor jig 702 is disposed in the predetermined position in a longitudinal direction of the image formation lens 205. Then, a position through which a laser beam passes to the image formation lens 205 is determined from the result of detection by the CCD line sensor 701, and the support member 502 is slid along the U-shaped groove so that the laser beam is incident on the predetermined position in the image formation lens 205. Then, the image formation lens 205 is moved in a Z-axis direction accompanied by the lens hold member 501. Thus, the incident position of the laser beam in the image formation lens 205 is adjusted, and the support member 502 is attached and secured to the housing 200. Depending on the accuracy of a lens, the support member 502 is not tucked into the inside of the U-shaped groove and secured. Namely, the support member 502 may be secured without being tucked into the inside of the U-shaped groove. After adjustment, the CCD sensor jig 702 is removed from the image formation lens 205. In attaching the support member, for example, a UV adhesive which shows a high viscosity may be used. In the present exemplary embodiment, as an example, an adhesive is used as a securing means. However, the lens support member 502 may be secured to the housing 200 using a screw after adjustment. As described above, a position where the support member 502 is secured in the U-shaped groove of the housing 200 is determined from the result read by the CCD line sensor 701, and the support member 502 is secured to the housing 200.

Figure 8:
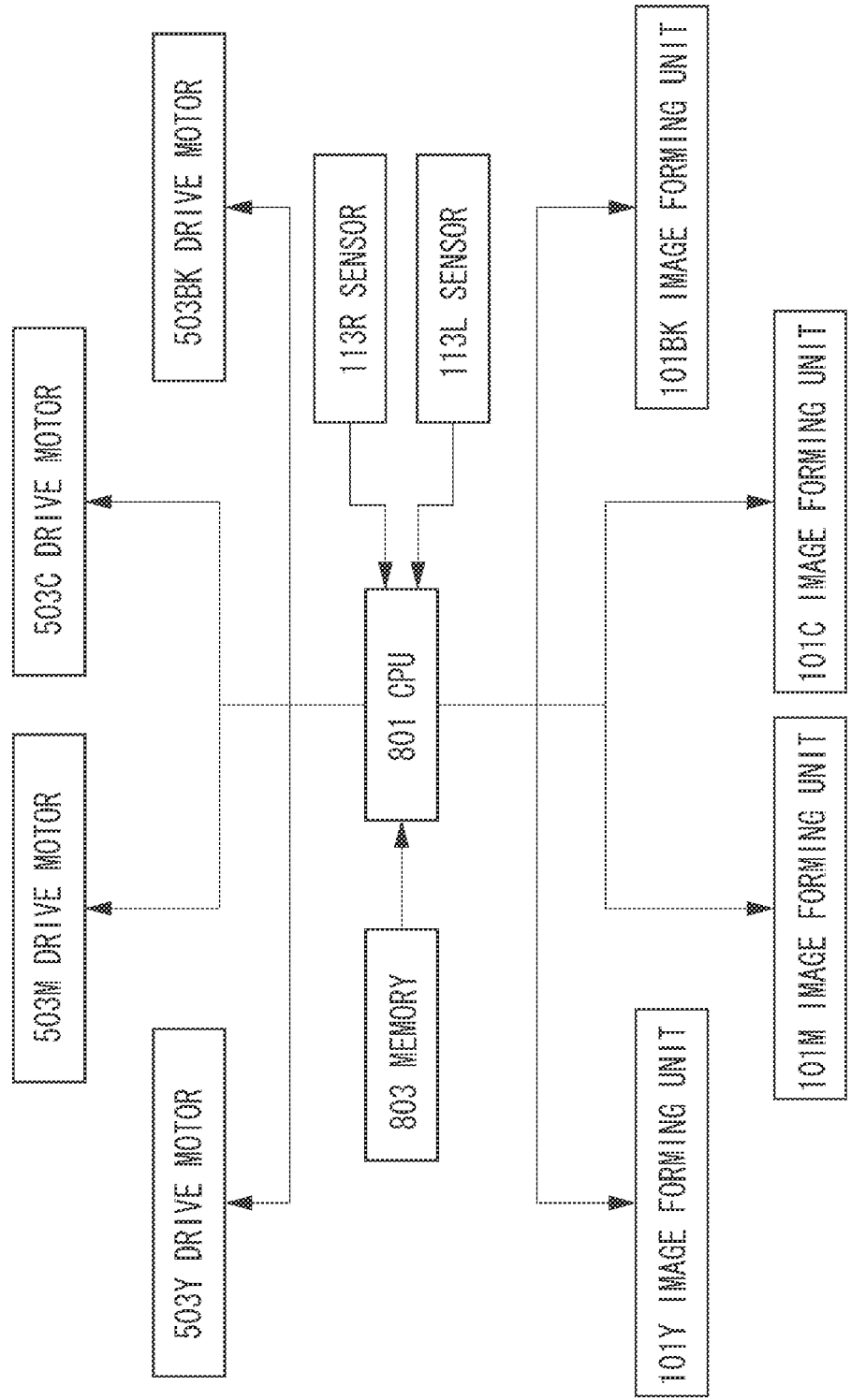
FIG. 8 illustrates a block diagram for executing auto registration in an image forming apparatus according to the present exemplary embodiment.
Figure 9:
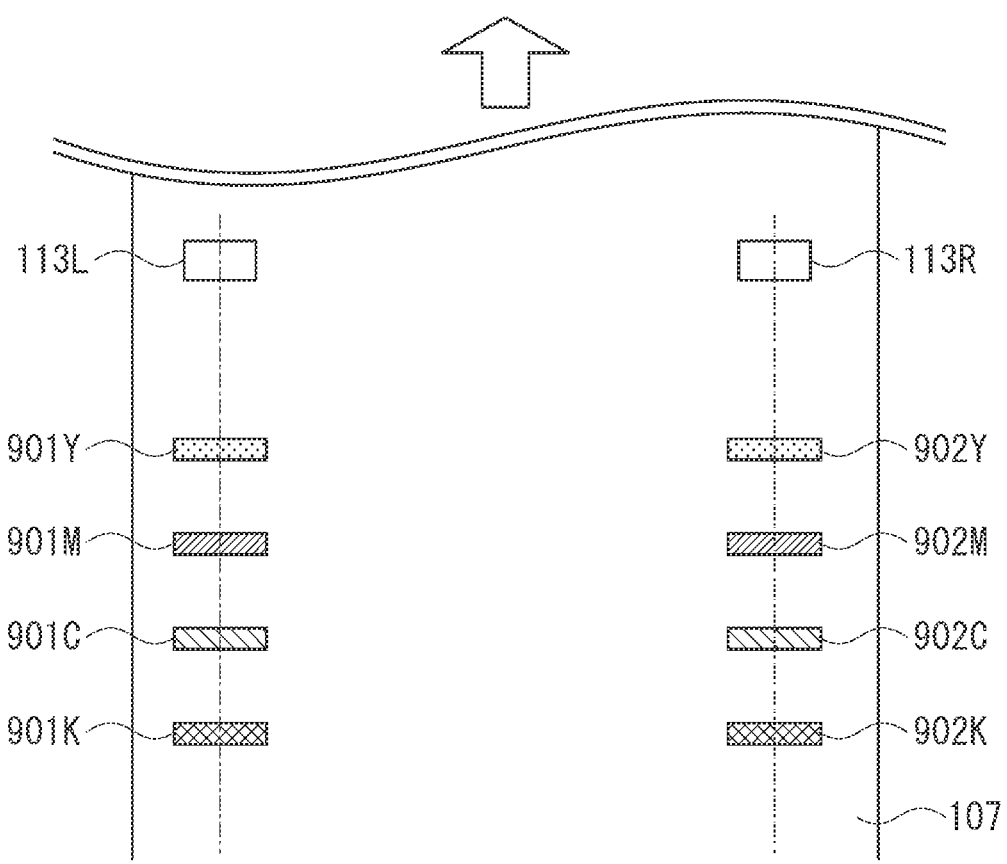
FIG. 9 illustrates a predetermined pattern image formed on an intermediate transfer belt.

Next, an automatic image displacement correction function (auto registration) of automatically correcting the inclination of scanning line on a photosensitive drum will be described. FIG. 8 illustrates a block diagram for executing auto registration in the image forming apparatus 100 according to the present exemplary embodiment. A CPU 801 causes the image forming units 101Y, 101M, 101C, and 101Bk to form predetermined pattern images 901Y, 901M, 901C, 901Bk, 902Y, 902M, 902C, and 902Bk as illustrated in FIG. 9 on the intermediate transfer belt 107 (onto intermediate transfer member). Further, the CPU 801 causes sensors 113R and 113L to read the above-described predetermined pattern image. In a memory 803, the amount of driving of a drive motor when an inclination is corrected is stored. The CPU 801 reads the amount of driving from the memory 803 to make calculations of drive motors 503Y, 503M, 503C, and 503Bk.

As illustrated in FIG. 9, the predetermined pattern images 901Y, 901M, 901C, and 901Bk; and the predetermined pattern images 902Y, 902M, 902C, and 902Bk are formed in the respective reading ranges of the sensors 113R and 113L so as to be paired respectively. The CPU 801 calculates the inclination of scanning line corresponding to each color from a difference in reading timing between the sensor 113R and the sensor 113L.

Figure 10:
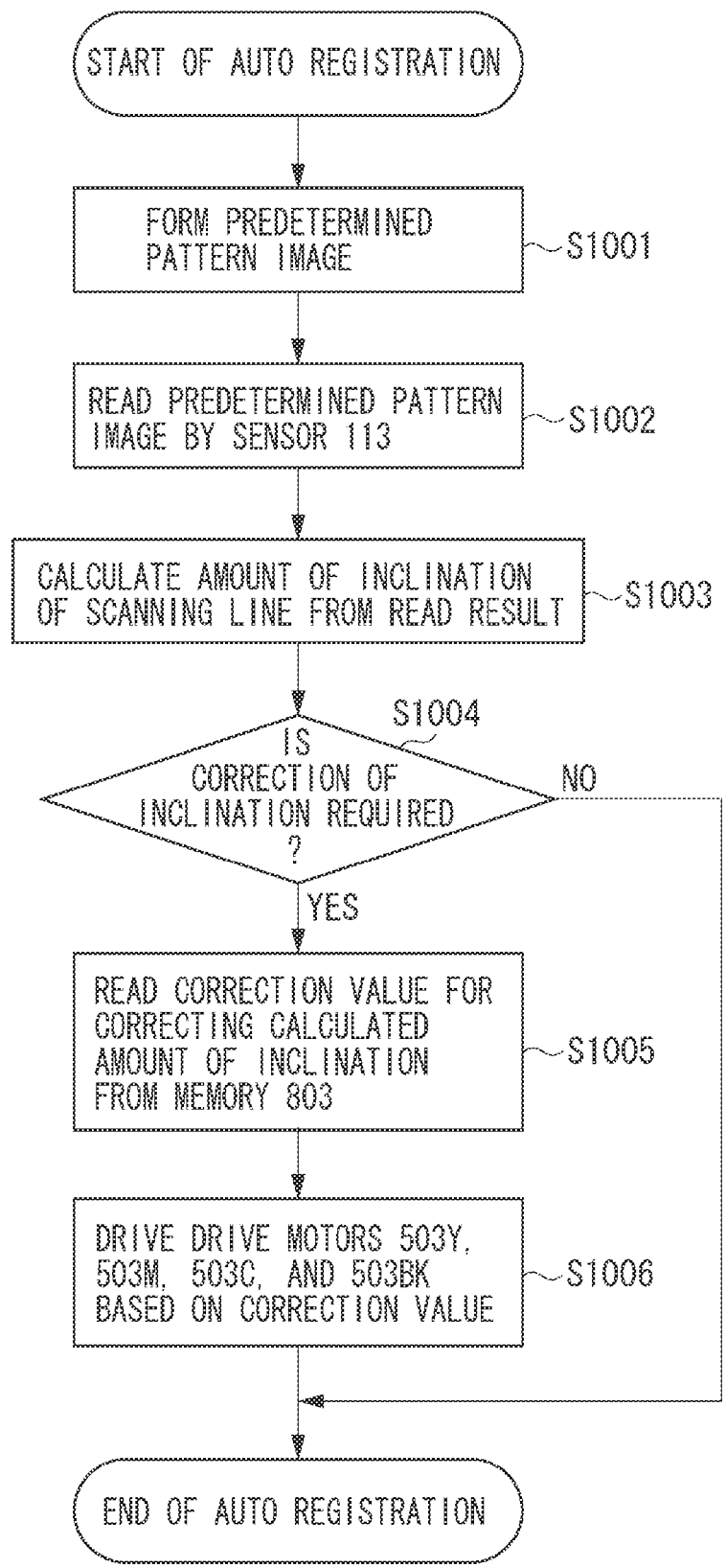
FIG. 10 is a flowchart illustrating auto registration executed by a CPU.
Figure 11:
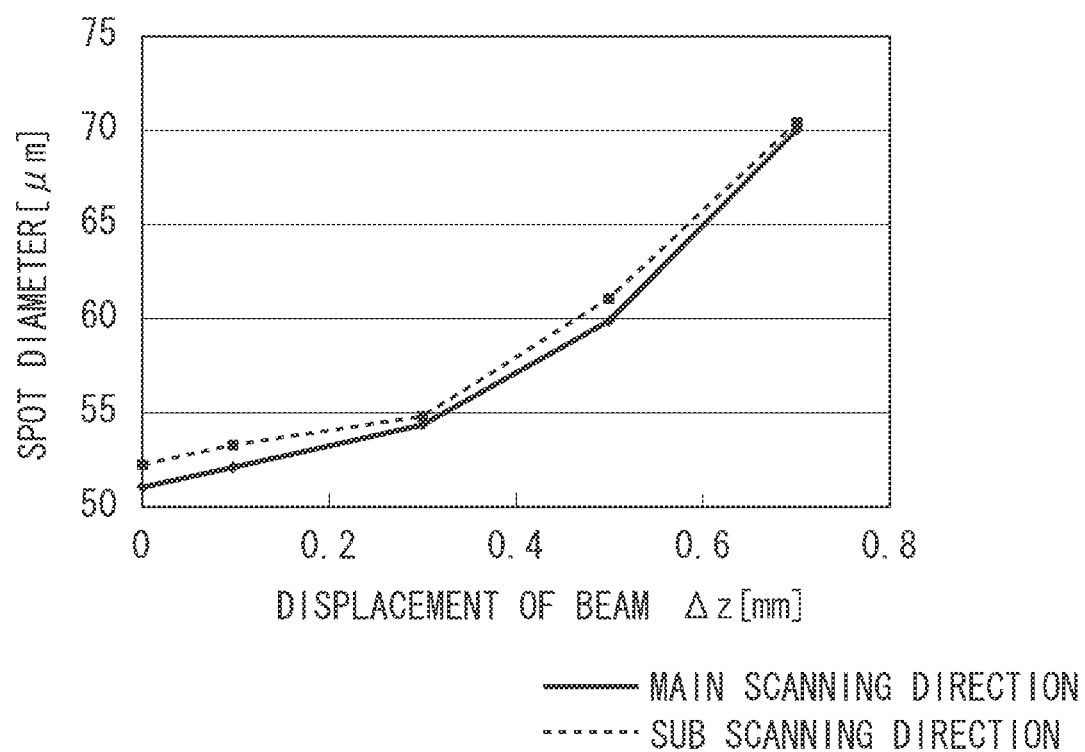
FIG. 11 illustrates a spot diameter distribution (vertical axis) relative to the amount of displacement (horizontal axis) between a passage position of a laser beam and the lens generatrix in a lens including aspheric surface lenses.

FIG. 10 is a flowchart illustrating auto registration executed by the CPU 801. The auto registration is started at predetermined timing such as an interval between papers after the predetermined number of images is formed directly after the power source of the image forming apparatus is turned ON. First, in step S1001, the CPU 801 causes the image forming units 101Y, 101M, 101C, and 101Bk to form the pattern images 901Y, 901M, 901C, 901Bk, 902Y, 902M, 902C, and 902Bk. Next, in step S1002, the CPU 801 causes the sensors 113R and 113L to read the above-described predetermined pattern images. In step S1003, the CPU 801 determines the amount of inclination of scanning line of each color from the read result. In step S1004, the CPU 801 determines whether correction of inclination of scanning line is required. If it is not required (NO in step S1004), the auto registration ends. If correction of inclination of scanning line is required (YES in step S1004), in step S1005, from the calculated amount of inclination, the CPU 801 reads a correction value from the memory 803. Then, in step S1006, the CPU 801 drives the drive motors 503Y, 503M, 503C, and 503Bk based on the read correction value. Thus, by executing auto registration, correction of inclination can automatically be performed. In the present exemplary embodiment, as an example of auto registration, the method for correcting the inclination is described. However, this method can also be applied to correction of bending. When correction of bending is performed, at least one pattern image is formed on pattern images of right and left provided in FIG. 9. In other word, at least one pattern image is formed between the pattern images 901Y and 902Y. Sensors to detect the pattern images are provided. The CPU 801 determines the bending state of scanning line from the result detected by three or more sensors including the sensors 113R and 113L. Then, in order to correct the bending of scanning line, the image formation lens 205 is automatically rotated. In this case, a drive motor will be installed in the part of the adjustment screw 511. The drive motor is driven by the CPU 801.

In the present exemplary embodiment, the lens hold member 501 is rotated using a contact point between the dislocation prevention portion 506a and the vertical bending portion 505 as a fulcrum to correct the inclination of scanning line. However, the rotation center when the inclination of scanning line is corrected is not limited to the contact point between the dislocation prevention portion 506a and the vertical bending portion 505. For example, a shaft parallel to the optical axis of the image formation lens 205 is formed at the end of the image formation lens 205. Then, the image formation lens 205 may be rotated around the shaft in a plane where the optical axis is the normal. At this time, a second vertical bending portion may be vertically installed from the lens hold member 205, and the shaft parallel to the optical axis of the image formation lens 205 passes through a circular hole provided on the second vertical bending portion. Further, in the present exemplary embodiment, as a lens to be rotated, the image formation lens 205 has been described as an example. However, a lens that adjusts the initial installation position as illustrated in the present exemplary embodiment is not limited to the image formation lens 205. Any lens is useful that is disposed between the polygon mirror 203 and the photoreceptor, and can perform correction of inclination and bending of scanning line by rotating the lens about the predetermined rotation shaft (e.g., cylindrical lens).

As described above, the rotation shaft of the image formation lens 205 provided to correct an inclination of scanning line can be moved and adjusted, so that a laser beam can be incident on the suitable position on the image formation lens 205. Accordingly, a change in spot shape of the laser beam on the photosensitive drum or a displacement of image formation position of the laser beam on the photosensitive drum from the ideal image formation position can be suppressed even if correction of inclination and bending of scanning line is performed.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-202679 filed Sep. 2, 2009, which is hereby incorporated by reference herein in its entirety.

What is claimed is:

1. An optical scanning device comprising:
a light source configured to emit a laser beam to expose an image bearing member;
a deflect unit configured to deflect the laser beam such that the laser beam scans the image bearing member;
a lens configured to guide the deflected laser beam to the image bearing member;
a first unit configured to hold the lens;
a second unit connected to the first unit at one end of the lens in a longitudinal direction of the lens;
a first moving unit disposed at an other end of the lens in the longitudinal direction of the lens and configured to rotate the first unit around an axis parallel to an optical axis of the lens by using a contact point between the first unit and the second unit as a fulcrum;
a second moving unit configured to connect the first unit and the second unit to rotate the first unit around the longitudinal direction of the lens; and
a housing configured to contain the first unit, the second unit, the first moving unit and the second moving unit,
wherein the second unit and the housing include an adjustment mechanism disposed at the one end of the lens in the longitudinal direction of the lens, the adjustment mechanism being configured to adjust a position at which the second unit is to be fixed to the housing,
wherein the second moving unit rotates the first unit around the longitudinal direction of the lens with respect to the second unit,
wherein the adjustment mechanism includes a convex portion disposed on the second unit and an engaging portion disposed on the housing, the convex portion being configured to movably engage to the engaging portion,
wherein the engaging portion is configured to restrict movement of the convex portion such that a position of the second unit with respect to the housing is adjustable in a direction perpendicular to both the optical axis direction and the longitudinal direction of the lens, and the position of the second unit with respect to the housing is not adjustable in the optical axis direction, and
wherein, after the position of the second unit is adjusted with respect to the housing, the convex portion is fixed to the engaging portion.

2. The optical scanning device according to claim 1, wherein the convex portion is bonded to the engaging portion with an adhesive at the fixing position.

3. The optical scanning device according to claim 1, wherein the first moving unit includes a drive unit configured to rotate the first unit around a connection between the first unit and the second unit so as to correct an inclination of a scanning line of the laser beam with which the image bearing member is scanned.

4. A color image forming apparatus for forming an image using a toner having a plurality of colors, the color image forming apparatus comprising:
an image forming unit which is provided with a plurality of image bearing members and optical scanning devices according to claim 3 corresponding to each of the plurality of colors, and includes a plurality of developing units configured to develop an electrostatic latent image formed on the plurality of image bearing members by the plurality of optical scanning devices, as a toner image;
a transfer member onto which a toner image on the plurality of image bearing members is transferred;
a control unit configured to form a predetermined pattern image onto the transfer member by the image forming unit; and
a detection unit configured to detect the predetermined pattern image on the transfer member,
wherein the drive unit rotates the first unit around a connection between the first unit and the second unit based on a result of detection by the detection unit.

5. The optical scanning device according to claim 3, wherein the first unit rotates around the longitudinal direction of the lens with respect to the second unit that is fixed to the housing as a reference to correct curving of the scanning line.

6. The optical scanning device according to claim 5, wherein the axis parallel to an optical axis of the lens is perpendicular to the rotation axis of the lens which rotates around the longitudinal direction of the lens.

7. The optical scanning device according to claim 1, wherein the second moving unit rotates the first unit around the longitudinal direction of the lens so as to correct a curve of the scanning line of the laser beam with which the image bearing member is scanned.

8. An optical scanning device comprising:
a light source configured to emit a laser beam to expose an image bearing member;
a deflect unit configured to deflect the laser beam such that the laser beam scans the image bearing member;
a lens configured to guide the deflected laser beam to the image bearing member;
a first unit configured to hold the lens;
a second unit connected to the first unit at one end of the lens in a longitudinal direction of the lens;
a moving unit disposed at an other end of the lens in the longitudinal direction of the lens and configured to rotate the first unit around a fulcrum defined by a contact point between the first unit and the second unit; and
a housing configured to contain the first unit, the second unit and the moving unit,
wherein the second unit and the housing include an adjustment mechanism disposed at the one end of the lens in the longitudinal direction of the lens, the adjustment mechanism being configured to adjust a position of the second unit with respect to the housing,
wherein the adjustment mechanism includes a convex portion disposed on the second unit and an engaging portion disposed on the housing, the convex portion being configured to movably engage to the engaging portion until the second unit is fixed to the housing,
wherein, while adjusting the position of the second unit, the engaging portion is configured to restrict movement of the convex portion in the optical axis direction and to allow movement of the convex portion in a direction perpendicular to both the optical axis direction and the longitudinal direction of the lens, and
wherein the convex portion is fixed to the engaging portion after the position of the second unit is adjusted.

9. The optical scanning device according to claim 8, wherein, during fixing, the convex portion is bonded to the engaging portion with an adhesive at the fixing position.

* * * * *